(12) United States Patent
Dole

(10) Patent No.: US 7,552,742 B2
(45) Date of Patent: Jun. 30, 2009

(54) HOT TAP DEVICE

(75) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 11/762,807

(22) Filed: Jun. 14, 2007

(65) Prior Publication Data

US 2008/0309072 A1    Dec. 18, 2008

(51) Int. Cl.
*F16L 41/12* (2006.01)
(52) U.S. Cl. .................. 137/318; 137/238; 285/197
(58) Field of Classification Search .......... 137/317, 137/318, 238, 237; 285/197
See application file for complete search history.

(56) References Cited

U.S. PATENT DOCUMENTS

| | | | |
|---|---|---|---|
| 3,976,091 A | 8/1976 | Hutton | 137/318 |
| 4,223,925 A | 9/1980 | Reneau et al. | 285/197 |
| 4,331,170 A | 5/1982 | Wendell | 137/15.12 |
| 4,332,272 A | 6/1982 | Wendell | 137/318 |
| 4,680,848 A | 7/1987 | Goldner | 29/213.1 |
| 5,396,814 A | 3/1995 | Tuttle et al. | 73/866.5 |
| 5,676,171 A * | 10/1997 | Heed | 137/318 |
| 5,842,496 A | 12/1998 | Delanty et al. | 137/15.14 |
| 5,893,686 A * | 4/1999 | Weiler | 137/318 |
| 5,896,885 A | 4/1999 | Svetlik | 137/15.14 |
| 6,640,827 B1 | 11/2003 | McClure | 137/318 |
| 2005/0241694 A1 | 11/2005 | Sayers | 137/318 |

OTHER PUBLICATIONS

Operating Instructions Style 930 & Style 931 for "*Mechanical-T ® and VICT-Tap Hole Cutting Tool*" Victaulic Company © 1986 (12 pages).

* cited by examiner

*Primary Examiner*—Kevin L Lee
(74) *Attorney, Agent, or Firm*—Ballard Spahr Andrews and Ingersoll, LLP

(57) ABSTRACT

A device for hot tapping is disclosed. The device includes a tube having a bore with an opening in the tube in fluid communication with the bore. The tube is connected to a valve which is connected to a saddle connection mounted on a pipe element in a piping network. A boring tool is inserted through the tube and the valve and bores a hole in the pipe element. Fluid under pressure flows from the pipe element through the tube and out through the opening. Swarf generated by the boring is entrained in the fluid and is flushed out through the opening. The device also includes a saddle connection having projections which bite into the pipe element and prevent motion. A hot tapping kit including tubes of different diameters is also encompassed by the invention.

5 Claims, 4 Drawing Sheets

HOT TAP DEVICE

FIELD OF THE INVENTION

This invention relates to devices and methods for adding a branch line to an existing piping network while the network is pressurized with fluid.

BACKGROUND OF THE INVENTION

It is often necessary to add a branch line to a piping network carrying fluid. If the network is pressurized and working, it may not be practical to shut the system down and drain the fluid so that a pipe element in the network may be cut and a "tee" fitting added to connect the branch line to the existing network. Equally onerous is the addition of a saddle connection, which requires that a hole be drilled in the pipe element to effect a connection. This is especially true for large systems, such as fire suppression sprinkler systems in buildings, where it is both impractical and unsafe to take the sprinkler system offline and drain it so that additional branches may be added to an existing network. For certain applications, such as hospital water service, it is universally acknowledged as unacceptable to interrupt water service for such routine alterations.

This problem has been long recognized and a method of "hot tapping" was developed which allows a branch line to be added to a pressurized piping network without depressurizing and draining the system.

Because hot tapping requires that an opening be cut in a pipe element of the existing piping network, prior art hot tapping methods and devices suffer the disadvantage of swarf, coupons and other debris from the cutting process becoming entrained in the fluid within the piping network. The debris can create serious problems as it may damage pumps and turbines in the system, jam valve actions or clog venturi and orifices. Of particular concern is the potential for debris to clog sprinkler heads of fire suppression systems. It would be advantageous to have a device and a method for hot tapping which does not suffer such disadvantages.

SUMMARY OF THE INVENTION

One aspect of the invention concerns a saddle connection for tapping into a pipe element. The saddle connection comprises a first strap having a concave surface with a curvature adapted to interface with the pipe element. A nipple is mounted on a boss on the first strap. The nipple has a bore therethrough. The bore extends through the first strap. A second strap has a concave surface with a curvature adapted to interface with the pipe element. The second strap is positionable opposite the first strap on the pipe element. The first and second straps surround the pipe element. Connection members are mounted on each end of each of the first and second straps. At least one of the connection members is adjustably tightenable for joining the straps in end to end relation surrounding the pipe element. One or more projections extend from the concave surface of the second strap. The projections bite into the pipe element and prevent motion of the straps relatively thereto. The saddle connection may be provided with a valve.

Another aspect of the invention concerns a device for tapping into a pipe element for attaching a valve to the pipe element using a saddle connection and a hole boring tool. The saddle connection is mounted on the pipe. The valve may be attached to the saddle connection before or after it is mounted on the pipe. The device comprises a tube having first and second ends. The first end of the tube is engageable with the valve. The tube has a sidewall defining a bore sized to receive the hole boring tool therethrough. A gland is mounted directly on the second end of the tube. An opening in fluid communication with the bore is in the sidewall. The boring tool passes through the tube and the gland. The tube has a sealing member therein engageable with the boring tool for sealing the tube bore. Preferably the seal comprises a ring seated on a shoulder within the bore and compressed against the shoulder by a surface of the gland. Fluid from within the pipe element, released when the boring tool penetrates the pipe element, is conducted through the saddle connection, through the valve, through the tube bore and into the gland. The fluid washes swarf from the pipe element outwardly through the opening. A control valve is in communication with the bore through the opening. The control valve controls flow of the fluid outwardly from the bore.

The invention also encompasses a kit providing a device for tapping into a pipe element for attaching a valve to the pipe element. The kit comprises a tube and a gland connectable directly to the tube. The tube is also engageable with the valve. The tube has a sidewall defining a bore therethrough. An opening in fluid communication with the bore is in the tube sidewall. The tube has a sealing member, for example, a flexible ring that is positioned against a shoulder within the bore of the tube.

DETAILED DESCRIPTION OF THE EMBODIMENTS

Figure 1:
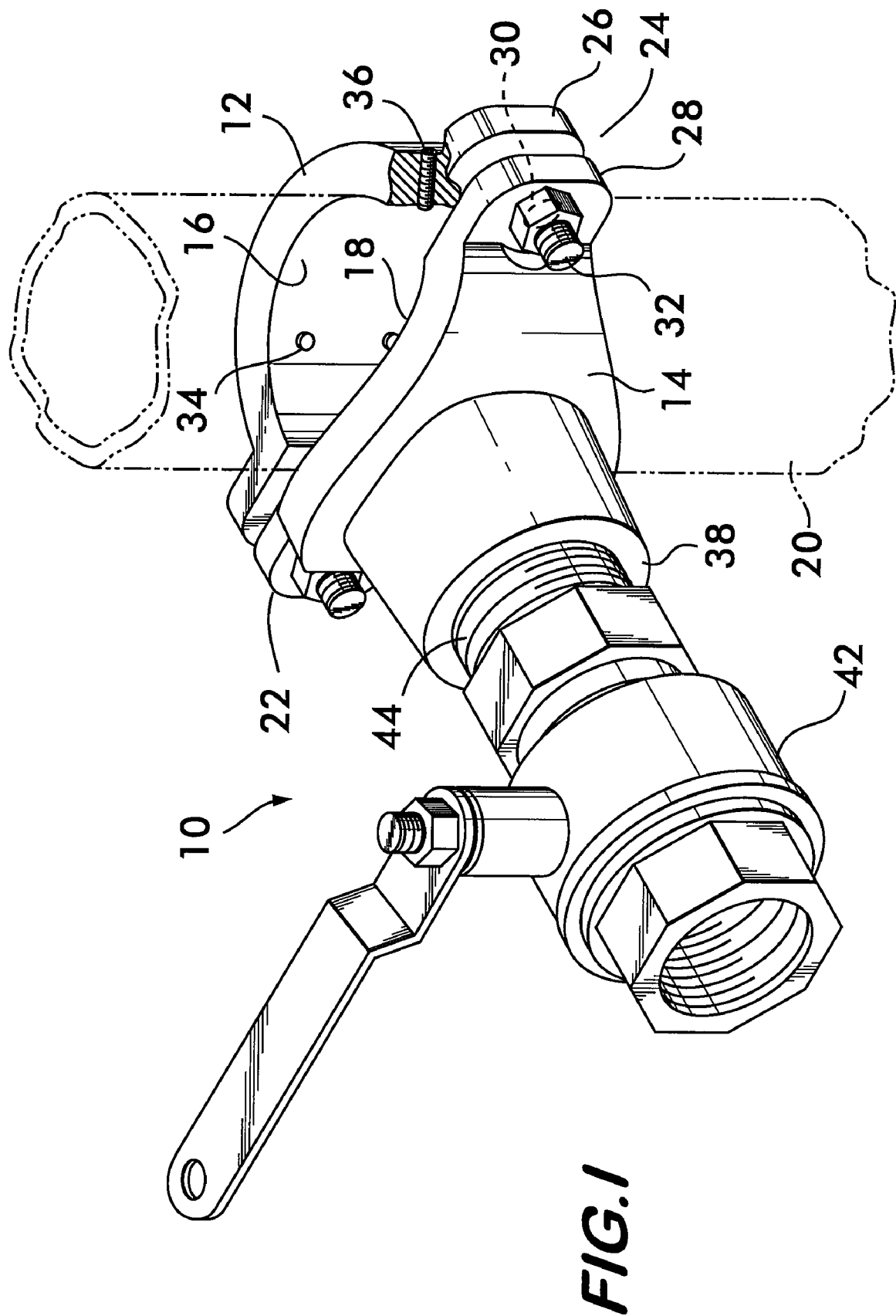
FIG. 1 is a perspective view of a saddle connection and valve for hot tapping according to the invention.

FIG. 1 shows a saddle connection 10 for creating a hot tap according to the invention. Saddle connection 10 comprises a rear strap 12 and a front strap 14. Each strap has a respective concave surface 16 and 18 with a curvature adapted to interface with a pipe element 20 in which the hot tap is being created. The front and rear straps surround the pipe element and are attached to one another end to end with connection members 22 and 24 positioned on opposite ends of each strap. In this example, both connection members comprise lugs 26 and 28 having holes 30 therein to receive threaded fasteners 32. The fasteners are adjustably tightenable for securing the straps 12 and 14 to the pipe element 20.

Rear strap 12 has one or more projections 34 which extend from its concave surface 16 to engage the pipe element 20. In this example, the projections comprise set screws 36 which may be adjusted to bite into the surface of the pipe element and prevent relative motion of the straps. Preferably, adjustment is made at the factory to ensure adequate bite on the pipe element when the fasteners 32 are tightened to appropriate torque values. The projections are preferably on the rear strap as illustrated, and may comprise projections which are discrete components, such as the set screws shown, or teeth which are integrally formed with the strap.

Front strap 14 has a boss 38 projecting from it with a nipple 44. Nipple 44 has a bore 40 therethrough (see FIG. 3) and a gasket 17 which surrounds the bore. The gasket seals the interface between the nipple 44 and the pipe element 20. The nipple is adapted to accept a valve 42 used in the hot tapping process (described below) and to control fluid flow to a branch line attached to the pipe element 20, which represents a portion of a piping network under pressure and in service when tapped to add the branch line. In this example, the nipple 44 has threads to connect it to valve 42, but other methods of attaching the valve to the boss, such as welding, brazing, soldering or using couplings or flanges are also feasible.

Figure 2:
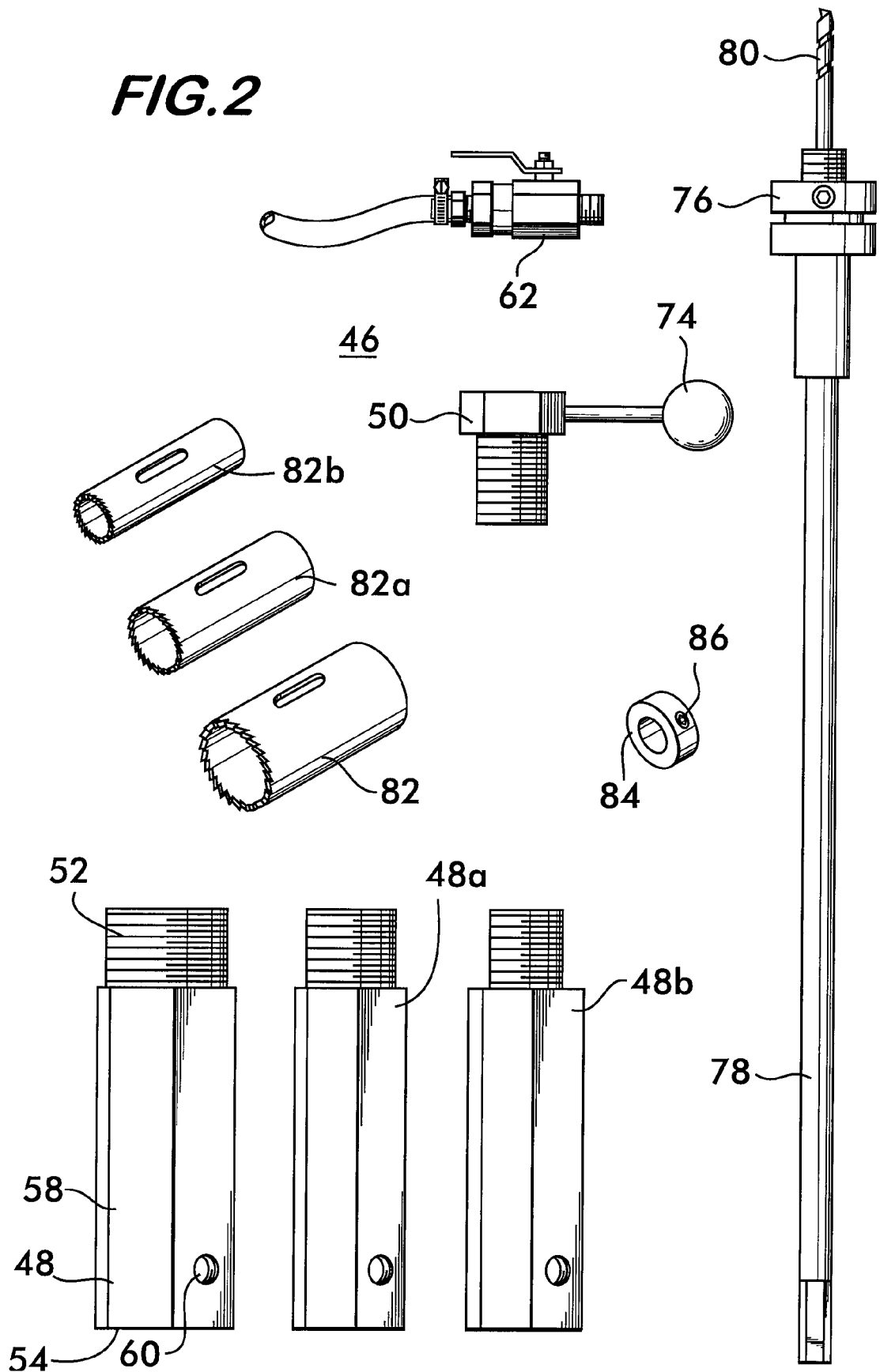
FIG. 2 illustrates components of a kit for hot tapping according to the invention.
Figure 3:
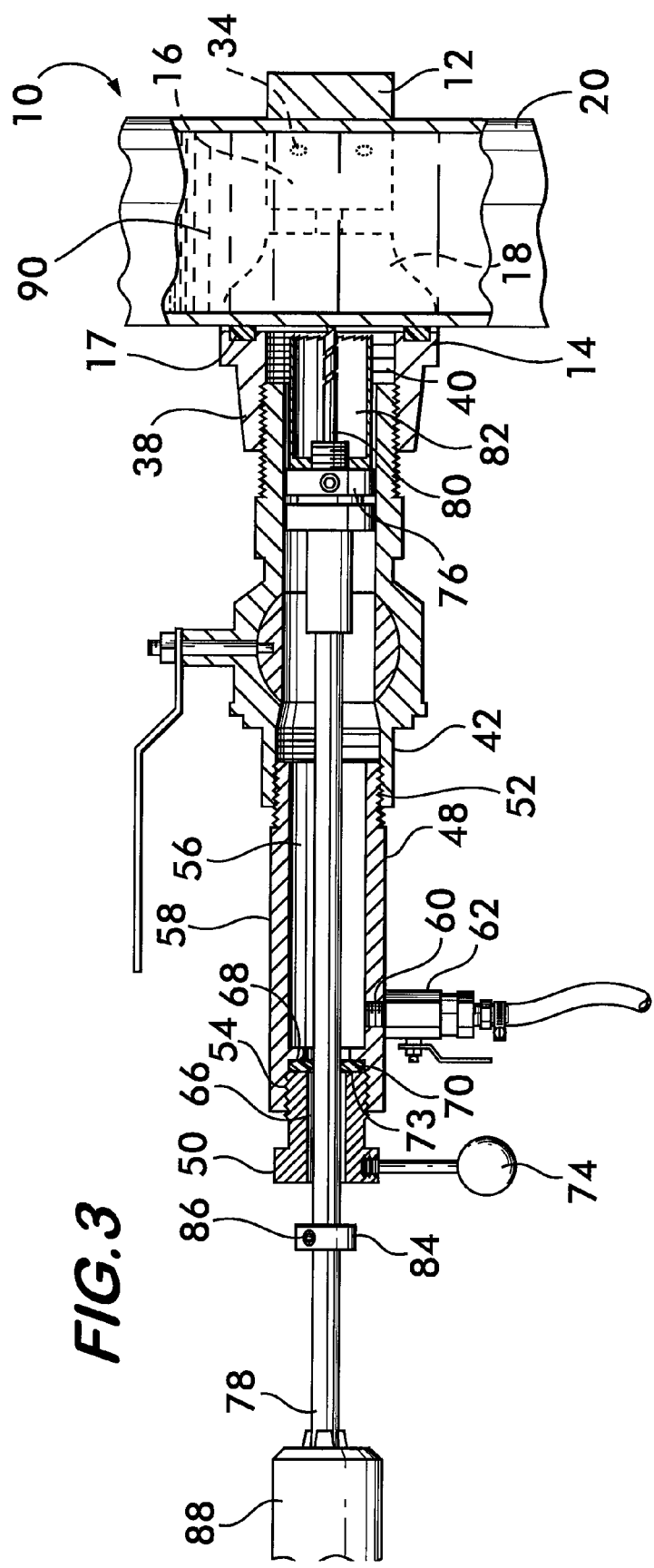
FIGS. 3 and 4 are longitudinal sectional views illustrating the device and a method of hot tapping using components according to the invention.

FIG. 2 illustrates components of a kit 46 to effect a hot tap according to the invention. At a minimum, kit 46 includes a tube 48 and a gland 50. Tube 48 has opposite ends 52 and 54. As best shown in FIG. 3, end 52 of tube 48 is adapted to connect to the free end of valve 42 (i.e., the end of the valve that will eventually be connected to the branch piping network), and end 54 is adapted to directly receive the gland 50 which seals the end of the tube as described below. Tube 48 has a bore 56 defined by the tube sidewall 58. An opening 60 is in the sidewall providing fluid communication between the bore 56 and the ambient. A control valve 62 may be connected to the tube and in fluid communication with the tube bore 56 to control the flow of fluid from the tube to the ambient.

Gland 50 is preferably threaded, and, unlike prior art hot tapping systems, engages the tube 48 directly without an intervening component. As best shown in FIG. 3, an inwardly projecting shoulder 68 is located within bore 56 of the tube 48 near the tube end 54. A sealing member 70 is received within the tube bore and engages the shoulder. The end face 73 of the gland 50 engages and compresses the sealing member against the shoulder when the gland is tightened, deforming the sealing member radially inwardly to form a seal around the shaft 78. Tightening of the gland is best effected manually by the use of handle 74.

As further shown in FIGS. 2 and 3, the kit 46 may also include a hole boring tool comprising an arbor 76 mounted on an elongated shaft 78. Arbor 76 receives a drill bit 80 and a hole saw 82. In operation, the drill bit drills a pilot hole and guides and stabilizes the hole saw, which cuts a hole in the pipe element as described below. The arbor is designed to accommodate different hole saws 82, 82*a* and 82*b* having different diameters for cutting different size holes for different branch diameters. The hole saws are readily interchangeable on the arbor. The kit may also include a plurality of hole saws as well as a plurality of tubes 48, 48*a* and 48*b* having different diameters for example, to provide versatility and allow a workman to select the appropriate size hole saw and tube for tapping a particular diameter branch line. The kit may also include a shaft stop 84, comprising a ring adjustably mounted on the shaft 78 via a set screw 86. The stop is positioned on the shaft so that it engages the gland 50 to limit the travel of the arbor and prevent the drill bit 80 or the hole saw 82 from penetrating the sidewall of pipe element 20 opposite the intended hole for the tap.

Operation of the hot tapping device according to the invention is described with reference to FIGS. 1, 3 and 4. As shown in FIG. 1, the saddle connection 10 is mounted on the pipe element 20 by placing the straps 12 and 14 on opposite sides of the pipe element, aligning the connection members 22 and 24, and then installing and tightening the fasteners 32 to secure the concave surfaces 16 and 18 into facing relation with the pipe element. The fasteners are torqued to cause the projections 34 to bite into the pipe element and compress gasket 17 which forms a fluid tight seal between the boss 38 and the pipe element 20. Alternately, set screws 36 are tightened after the fasteners are torqued to bite into the pipe element and prevent motion of the saddle connection.

It is preferred to provide the saddle connection with the valve 42 already connected, as this ensures that the proper valve and saddle combination are used, and allows the connection between the valve and the nipple to be pre-tested at the factory for fluid-tightness. Alternately, the valve 42 may be connected to the nipple 44 of the saddle connection 10 after the saddle connection has been mounted on the pipe element 20. As shown in FIG. 3, the valve is opened upon completion the saddle mounting. Although a ball valve is shown, other types of valves which allow for an unobstructed passage, such as a gate valve, could also be used.

One of the tubes 48, appropriate for the particular valve 42, is selected from the hot tapping kit 46 (FIG. 2). The gland 50, for sealing the tube 48, is connected to the tube 48 by engaging the gland 50 directly with the tube end 54. Control valve 62 is engaged with the opening 60 in the sidewall 58 of the tube 48. The control valve is opened to prevent an initial gas pressure build-up within the device during use. The appropriate hole saw 82 is selected from the kit 46 and mounted on the arbor 76. The shaft 78 on which arbor 76 is mounted, is then inserted through bore 56 of tube 48 and through the duct 66 in gland 50. The shaft stop 84 is then attached to the shaft 78. The arbor 76 is then inserted through valve 42 and through nipple 44 so that the drill bit 80 and hole saw 82 are positioned to engage the pipe element 20. The end 52 of tube 48 is then engaged with the valve 42. Connection between the tube and the valve is preferably made by tapered pipe threads, and the tube 48 advantageously has a hexagonal cross sectional shape to allow a flat-faced wrench, such as an adjustable wrench, to be used to tighten the connection. Round sections are also feasible, but would suffer repeated damage when toothed pipe wrenches are used.

Using handle 74, the gland 50 is tightened, compressing the end face 73 of gland 50 against the ring seal 70. The compression force exerted by the end face deforms the ring seal 70 which expands radially inwardly at its inner diameter to engage and seal against the elongated shaft 78. The seal surrounds the shaft and allows it to turn and move axially while maintaining a substantially fluid tight seal, preventing fluid within the tube bore 56 from leaking out past the shaft. The gland is initially tightened so that the shaft can turn easily. If the gland leaks, then it is tightened enough to stop the leak but not so much as to prevent the shaft from turning.

The shaft stop 84 is then locked into position on the shaft 78 using the set screw 86, and the shaft is connected to a portable drill, only the chuck 88 of which is illustrated.

Figure 4:
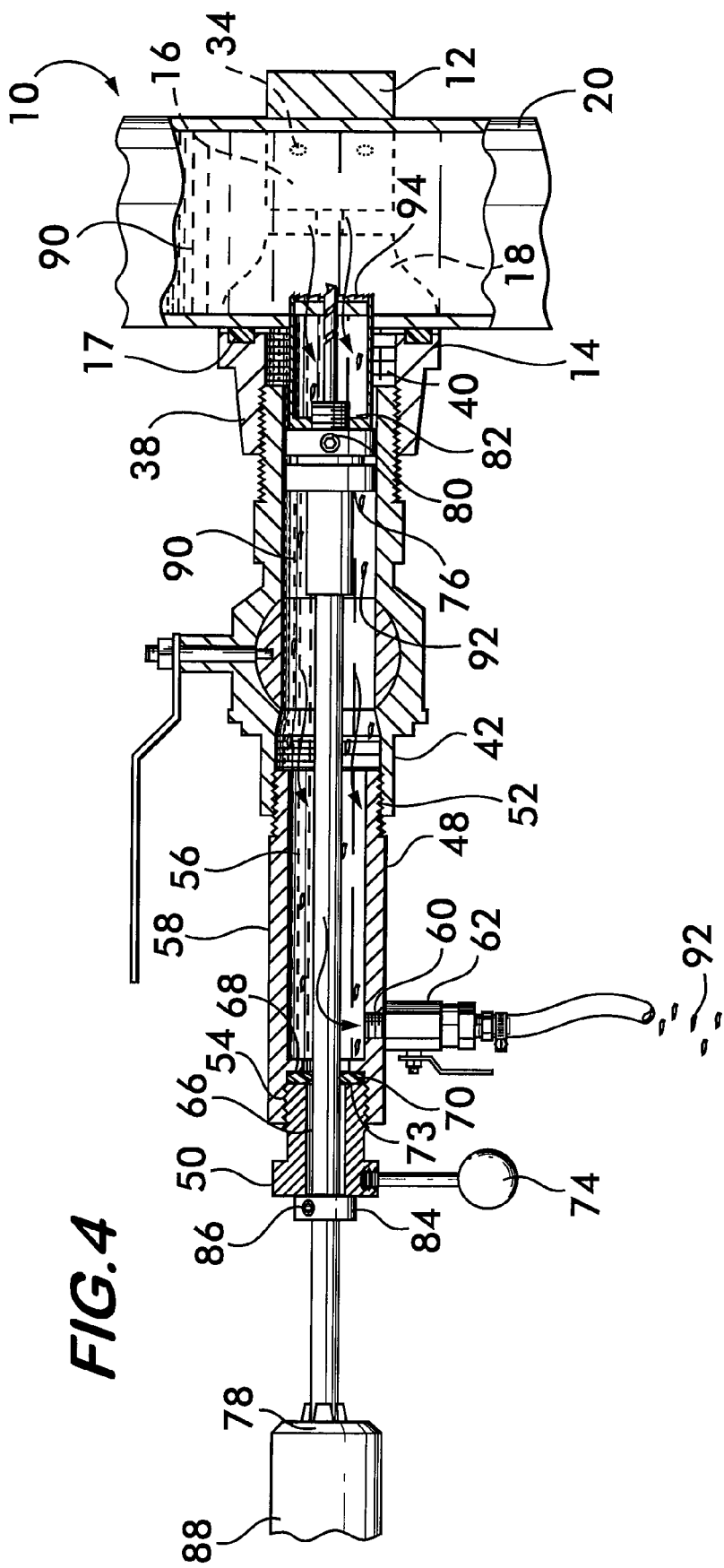

As shown in FIG. 4, the shaft 78 is rotated by the drill and the drill bit 80 at the end of the arbor 76 drills a pilot hole. As the shaft advances axially toward the pipe element, the hole saw 82 engages and cuts a hole in the pipe element in alignment with the nipple bore 40. When the drill bit 80 penetrates the pipe element, fluid 90, under pressure within the pipe element, begins to flow from the pipe element. The fluid carries swarf 92 from the drilling with it. Additional swarf is generated by the hole saw, which also creates a coupon 94 which lodges within the hole saw 82.

The pressure within the pipe element forces the fluid 90 and the entrained swarf 92 to flow through the nipple bore 40, through the valve 42 and into the tube 48. The control valve 62, being open, creates and maintains a pressure differential at the hole formed in the pipe element 20. This pressure differential ensures that the swarf is conducted through the tube and out to the ambient instead of being entrained in the fluid within the pipe element 20. The swarf 92, flushed from the tube, may be conveniently collected in a bucket for later disposal. The pressure differential also traps the coupon in the hole saw and prevents it from dislodging and becoming entrained in the fluid in the pipe element. Fluid flows around coupon 94 and out of the hole saw 82 through openings in its side wall.

Once the hole is cut in the pipe element, the shaft 78 is withdrawn through the tube 48 until the hole saw and drill bit are clear of the valve 42. The valve 42 is then closed and the tube 48 disengaged from it. The valve is then ready to be connected to a new branch line of the piping network.

The device and method according to the invention provide a way to tap into an existing pressurized fluid line while decreasing the probability that swarf or other debris generated in the cutting process will be entrained in the fluid flowing through the piping network. The device provides the additional benefit of preventing the boring tool from blowing out under pressure due to the presence of the gland halting its outward motion. Because the gland directly engages the tube without an intervening component, the hot tapping device according to the invention is more compact, has fewer components and is simpler to use. The design also is more economical and presents fewer leak paths.

What is claimed is:

1. A device for tapping into a pipe element for attaching a valve to said pipe element using a saddle connection and a hole boring tool, said saddle connection being mounted on said pipe, said valve being attached to said saddle connection, said saddle connection comprising:
   a first strap having a concave surface with a curvature adapted to interface with said pipe element;
   a nipple mounted on said first strap, said nipple having a bore therethrough, said bore extending through said first strap;
   a second strap having a concave surface with a curvature adapted to interface with said pipe element, said second strap being positioned opposite said first strap on said pipe element, said first and second straps surrounding said pipe element;
   connection members mounted on each end of each of said first and second straps, at least one of said connection members being adjustably tightenable for joining said straps in end to end relation surrounding said pipe element;
   at least one projection extending from said concave surface of said second strap, said projection for biting into said pipe element and preventing motion of said straps relatively thereto; said device comprising:
   a tube having first and second ends, said first end being engageable with said valve, said tube having a sidewall defining a bore sized to receive said hole boring tool therein, said bore having an inwardly projecting shoulder, a sealing member comprising a flexible ring positioned within said bore against said shoulder and having an inner diameter engageable with said hole boring tool;
   a gland engaged directly with said second end of said tube, said boring tool passing through said gland, said gland having a surface engageable with said ring to compress and deform said ring against said shoulder to effect a fluid tight seal against said hole boring tool;
   an opening in said sidewall in fluid communication with said bore; and
   wherein fluid from within said pipe element, released when said boring tool penetrates said pipe element, being conducted through said saddle connection, through said valve and through said tube bore, said fluid washing swarf from said pipe element outwardly through said opening in said sidewall.

2. A device according to claim 1, further comprising a control valve mounted on said tube, said control valve being in fluid communication with said bore through said opening in said sidewall, said control valve controlling flow of said fluid outwardly from said tube.

3. A device according to claim 1, wherein said projection comprises a threaded set screw extending through a threaded opening in said second strap.

4. A device according to claim 3, further comprising four of said set screws positioned in said second strap.

5. A device according to claim 1, wherein said connection members comprise lugs attached to each end of each of said straps, said lugs having holes therein adapted to receive threaded fasteners, said fasteners being tightenable for securing said straps to said pipe elements.

* * * * *